No. 12,081. REISSUED FEB. 17, 1903.

A. M. BATES.

SACK, BAG, &c.

APPLICATION FILED SEPT. 23, 1901.

Witnesses.

Edward T. Wray

Homer L. Kraft

Inventor.

Adelmer M. Bates by Parker & Parker

Attorneys.

UNITED STATES PATENT OFFICE.

ADELMER M. BATES, OF CHICAGO, ILLINOIS.

SACK, BAG, &c.

SPECIFICATION forming part of Reissued Letters Patent No. 12,081, dated February 17, 1903.

Original No. 623,198, dated April 18, 1899. Application for reissue filed September 23, 1901. Serial No. 76,315.

*To all whom it may concern:*

Be it known that I, ADELMER M. BATES, a citizen of the United States, residing at Chicago, in the county of Cook and State of Illinois, have invented certain new and useful Improvements in Sacks, Bags, and other Flexible Receptacles, of which the following is a full, clear, and exact specification.

My invention relates to sacks, bags, and other flexible receptacles for holding granular or powdered substances, such as salt, sugar, flour, meal, tea, coffee, &c.; and it has for its primary object to provide improved and simple means whereby the same may be entirely filled after the stitching, pasting, or other securing operation is entirely completed, and at the same time to automatically prevent the contents from afterward escaping through the filling-aperture, thereby enabling the sack or bag to be stitched or secured entirely by machinery with a resultant saving of material, labor, and expense.

In carrying out my invention I provide the bag or sack at the corner with a comparatively small filling-aperture, which may be formed by omitting to secure the edges of the material at that point, and around this aperture I form an inwardly-projecting collapsible neck or tubular portion constituting valvular lips or folds, which will open to admit the end of a filling-funnel, but will automatically close under the pressure of the contents when the funnel is withdrawn, and thus prevent leakage with a resistance increasing in direct ratio to the pressure of the contents thereagainst.

With the described ends and objects in view my invention consists in the features of novelty herein described, and particularly pointed out in the claims, reference being had to the accompanying drawings, in which—

Figure 3:
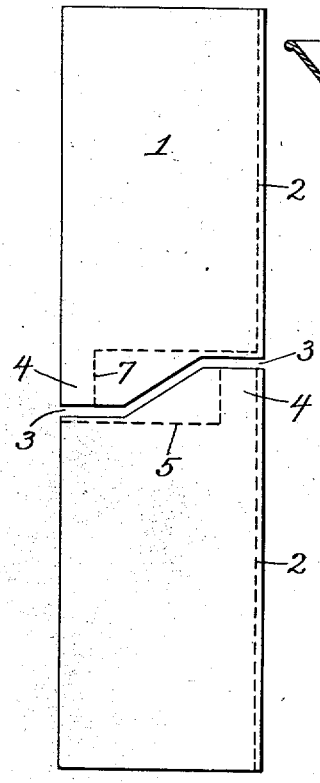
Figure 1:
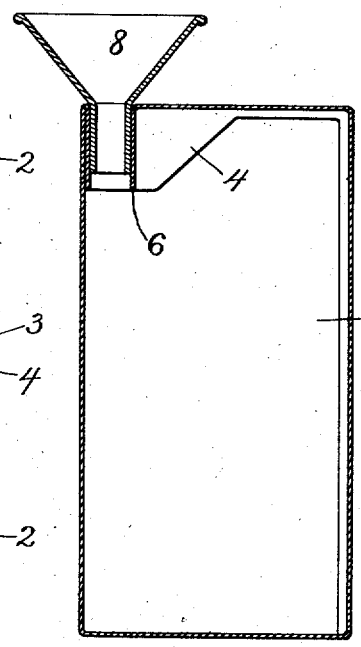
Figure 2:
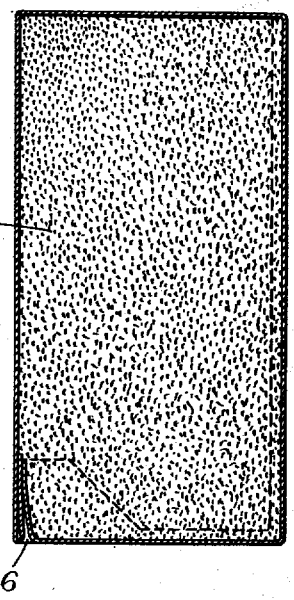
Figure 4:
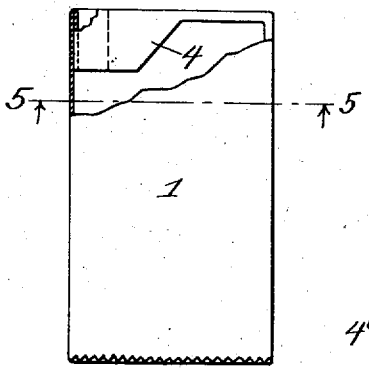
Figure 5:
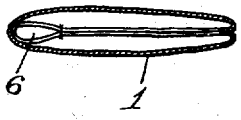

Figure 1 is a vertical sectional view of a bag or sack constructed according to my invention, showing a funnel introduced through the filling-aperture. Fig. 2 is a similar view illustrating the sack filled and inverted, showing the valvular folds or lips at the lower corner closed against the escape of the contents. Fig. 3 is a diagrammatic view illustrating the manner of forming two bags or sacks by a single cut of the sack material. Fig. 4 is a side elevation of my improved sack, partly broken away, showing the interior valvular folds or collapsible neck before referred to. Fig. 5 is a transverse section thereof looking upwardly from the line 5 5, Fig. 4; and Fig. 6 is a side elevation, partly broken away, illustrating a modification appropriate for large sacks hereinafter described.

The bag or sack may of course be composed of any of the materials from which such articles are usually made; but when composed of cotton cloth or other fabric it is desirable in some instances that the securing of the edges be effected by means of stitching. Heretofore it has been customary to make sacks of a piece of folded cloth, as shown more clearly in Fig. 3, having a line of sewing-machine stitching extending across one end and along one side, thus forming a bag open at one end, the latter end being usually closed by hand-stitching. In the accompanying drawings I have shown as an example of my invention a bag of this character, 1 representing the body of the bag, and 2 the line of sewing-machine stitching extending along one edge to secure the edges of the folded cloth together. In making small bags I prefer to employ a strip of cloth which has a selvage edge along each side and to cut from this strip a piece which when folded will be twice the length and once the width of a bag, and from this folded strip I form two blanks by cutting it transversely on the zigzag line 3, as indicated in Fig. 3, thus leaving a selvage edge at the outer end of each bag and at the corner thereof a projection or pair of lips 4, the projection 4 on one bag being adjacent to the stitched edge, while that on the other is next the doubled edge. The line of stitching 5, however, which forms the bottom of the bag is not carried entirely across the bottom, but within a short distance of the edge of the bag it is carried outwardly to the outer end of the projection 4, so as to form a neck or tubular projection 6, as more clearly indicated in Figs. 1, 4, and 5, the stitching 7 of the neck 6, the stitching 5 of the bottom, and 2 of the edge being continuous and produced, if desired, by machinery. In stitching the bag in which the projection 4 comes adjacent to the side stitching 2, however, it will be necessary to run off at the end of the projection 4 and then run back again along the edge to form the stitching 2, so as not to close the end of the tubular neck 6. After the bag or sack has been thus stitched it is turned right side out, and this will bring the projection 4 on the inside of the bag in the position shown in Fig. 4, with the tubular neck 6 projecting downwardly from one corner. The opposite end of the bag may now be securely stitched or otherwise fastened before the contents are inserted, and such end of the bag having selvage edges may be stitched on the machine by means of a whip-stitch, as indicated in Fig. 4, thus making it unnecessary to turn in the broad hem heretofore required when the end of the bag is sewed by the more open hand-stitch.

In order to fill the bag or sack thus constructed, it is simply necessary to introduce the neck of a funnel 8 or other suitable filling device through the tubular projection 6. As the bag fills the contents will rise around and press against the sides of the projection 6, and therefore as soon as the filling implement is withdrawn the pressure of the contents will force the valvular lips together and prevent the escape of the contents with a resistance increasing with the pressure of the contents thereon, as shown in Fig. 2.

Figure 6:
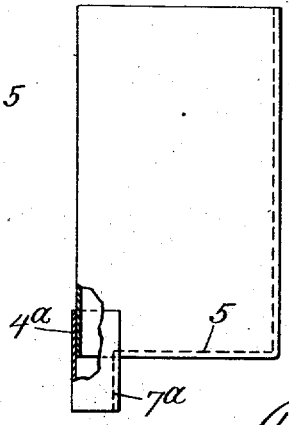

The method of forming the tubular extension 6 described with reference to Fig. 3 is appropriate where the amount of material wasted between the two extensions is insignificant owing to the small dimensions of the sack; but where the sacks are of large size and this wastage of material would be important the extension or tubular neck may be formed by a separate piece secured at the corner of the sack, as indicated in Fig. 6. This separate piece is shown at $4^a$ and consists of a simple piece of material folded over on itself and lapping around both sides of the bag at the corner and is held in this position while its lapped edges are being stitched toward and onto the bag to form the tubular projection 6, whence the stitching is carried across the bottom to the farther corner, as shown at 5, and thence down the side.

With a bag or sack thus constructed it will be seen that I am enabled to fill the bag after all the stitching or other securing operation is entirely completed and the bag is virtually closed, and in the case of cloth bags all the stitching may be done by machinery, and consequently the wide lap or hem necessary for security where the more open hand-stitch is employed may be dispensed with and a considerable saving of bag material thereby effected.

My invention also forms an appropriate means for the filling of paper and, in fact, all other bags or sacks in advance of sale, inasmuch as the sack may be appropriately secured all around by the manufacturer and shipped to the grocers and other dealers ready to be filled, thus forming a tight package when filled and relieving the grocer or other user of the necessity of securing the edges, which is an operation difficult to accomplish properly after the contents are inserted, owing to the necessity of doing it by hand.

My improved sack or bag is more particularly intended for use in connection with an automatic bag-filling machine—such, for instance, as that shown and described in my application, Serial No. 686,791, for United States Letters Patent, filed July 25, 1898, in which the bag is held in a diagonal or tipped position, with one corner projecting upwardly above the other, the higher corner being the one which is provided with the filling aperture and through which the spout or funnel of the filling-machine is inserted. The purpose of holding the bag in the said diagonal position is to cause the material to fully fill the bag without necessitating any jolting or shaking to cause it to settle in the corners, it being understood that granular or pulverized material in running out of the spout will form a peak, and the filling spout or aperture being located in the corner of the bag such peak will form itself in and accurately fill such corner, so that the bag may be completely filled by simply allowing the material to gravitate into it. Hence, aside from the fact that the flexible neck $4^a$ may be attached more advantageously when located at the corner of the bag, this particular location of the filling-aperture is a very important feature of my invention.

I have therefore claimed, broadly, herein a bag or flexible receptacle having a filling-aperture located at the corner thereof and a valvular fold arranged at and guarding said aperture and forming a closure for preventing the escape of the contents of the bag.

Having thus described my invention, what I claim as new therein, and desire to secure by Letters Patent, is—

1. As a new and useful article of manufacture, a bag or sack having a projection at one corner, the edges of the material forming said sack being secured along a line extending across the end of the sack to a point slightly beyond the edge of said projection and then outwardly along the edge of said projection for securing the edges of said projection together, and forming, when the sack is turned right side out, an internal tubular extension open at both ends, substantially as set forth.

2. As a new and useful article of manufacture, a bag or sack having a small filling-aperture at one corner thereof, and a separate piece $4^a$ overlapping the corner of said bag around said aperture and being secured to the bottom of the bag and constituting a tubular extension extending normally into the bag, substantially as set forth.

3. As a new article of manufacture, a bag provided with a filling-aperture and having at said aperture an automatically-closing flexible valve structure projecting into said bag.

4. As a new and useful article of manufacture, a bag or flexible receptacle having a filling-aperture located at the corner thereof and a valvular fold arranged at and guarding said aperture and forming a closure for preventing the escape of material.

5. As a new and useful article of manufacture, a bag or sack having a filling-aperture located at one corner thereof and a flexible neck surrounding said aperture in said corner and having a closure or valve for said aperture.

6. As a new and useful article of manufacture, a bag or sack having a filling-aperture located at one corner thereof and a flexible neck or tubular extension arranged around said aperture in said corner and projecting into the bag or sack and forming a closure or valve for said aperture.

ADELMER M. BATES.

Witnesses:
HOMER L. KRAFT,
FANNY B. FAY.